United States Patent

[11] 3,633,004

[72] Inventors Robert L. James
Bloomfield, N.J.;
David A. Tawfik, Rego Park, N.Y.
[21] Appl. No. 860,596
[22] Filed Sept. 24, 1969
[45] Patented Jan. 4, 1972
[73] Assignee The Bendix Corporation

[54] INTEGRATOR/SYNCHRONIZER WITH INFINITE MEMORY INCLUDING A DRIFT-CORRECTING FEEDBACK CIRCUIT
6 Claims, 3 Drawing Figs.

[52] U.S. Cl. .......... 235/150.51,
235/183, 328/151, 340/347
[51] Int. Cl. .......... G06g 7/18,
G06g 1/00
[50] Field of Search .......... 235/150.51,
150.5, 150.52, 150.53, 183, 150.4; 328/151;
307/229, 230; 340/347 AD, 347 DA

[56] References Cited
UNITED STATES PATENTS

| | | | |
|---|---|---|---|
| 3,070,786 | 12/1962 | MacIntyre | 340/347 UX |
| 3,152,249 | 10/1964 | Schmid | 235/183 |
| 3,192,371 | 6/1965 | Brahm | 235/150.51 X |
| 3,404,857 | 10/1968 | Tippetts | 235/183 X |
| 3,430,227 | 2/1969 | Hillis | 328/151 X |
| 3,475,600 | 10/1969 | Spence | 235/183 |

*Primary Examiner*—Joseph F. Ruggiero
*Attorneys*—Anthony F. Cuoco and Plante, Arens, Hartz, Smith and Thompson

ABSTRACT: Apparatus including an analog integrator and means for operating the analog integrator in closed-loop configuration as a synchronizer. Circuits are provided for imparting infinite memory to the device and for minimizing output drift.

INVENTORS
DAVID A. TAWFIK
ROBERT L. JAMES
BY
ATTORNEY

INVENTORS
DAVID A. TAWFIK
ROBERT L. JAMES
BY
ATTORNEY

INTEGRATOR/SYNCHRONIZER WITH INFINITE MEMORY INCLUDING DRIFT-CORRECTING FEEDBACK CIRCUIT

BACKGROUND OF THE INVENTION

Field of the Invention

This invention relates to circuitry for integrating and synchronizing DC signals such as may be used in automatic flight-control systems or other such systems where infinite memory of integrator or synchronizer output levels is required and output drift must be minimized.

Description of the Prior Art

Existing equipment of the type described has comparative disadvantages in circuit-complexity, high cost, relatively low reliability and special component requirements. Moreover, this equipment is vulnerable to electromagnetic interference (EMI) to the extent that equipment failures can occur. The device of the present invention avoids these difficulties.

SUMMARY OF THE INVENTION

This invention contemplates apparatus including an operational amplifier having a capacitor connected in feedback configuration for providing an analog integrator. The analog integrator drives a digital follower and the integrator and digital follower outputs are compared and the resulting error signal adjusts the digital follower until said error signal approaches zero. During integration the output of the digital follower lags the output of the analog integrator until "hold" times occur i.e., periods when the input to the integrator is zero. During the "hold" times the digital follower output catches up with the integrator output and the error signal is reduced to some low level (near zero) within the threshold of the digital follower. While the error signal remains within this threshold, the output from the digital follower is, in effect, a fixed reference held constant through memory within the digital follower. To maintain the error signal within the threshold of the digital follower said signal is further reduced toward zero by applying it to an amplifier having a relatively negligible threshold and returning the amplifier output as negative feedback to the analog integrator.

One object of this invention is to provide an integrator/synchronizer having infinite memory.

Another object of this invention is to provide an integrator/synchronizer including a drift-correcting feedback circuit.

Another object of this invention is to provide an integrator/synchronizer including means for reducing EMI noise.

Another object of this invention is to provide an integrator/synchronizer of the type described having the advantages of simplicity, higher reliability and lower cost over similar devices now known in the art.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

With reference to FIG. 1 an input signal E, which may be a DC signal corresponding to an aircraft flight condition, is applied to an analog integrator designated generally by the numeral 2 and including an operational amplifier 4 and a capacitor 5 connected in feedback configuration to amplifier 4. Analog integrator 2 is of a conventional type such as described and shown at pages 356–358 of*Electronics for Scientists*, Malmstadt et al., W. A. Benjamin Inc., N. Y. 1962, with amplifier 4 therein providing an integrated signal $E_1$.

Figure 1:
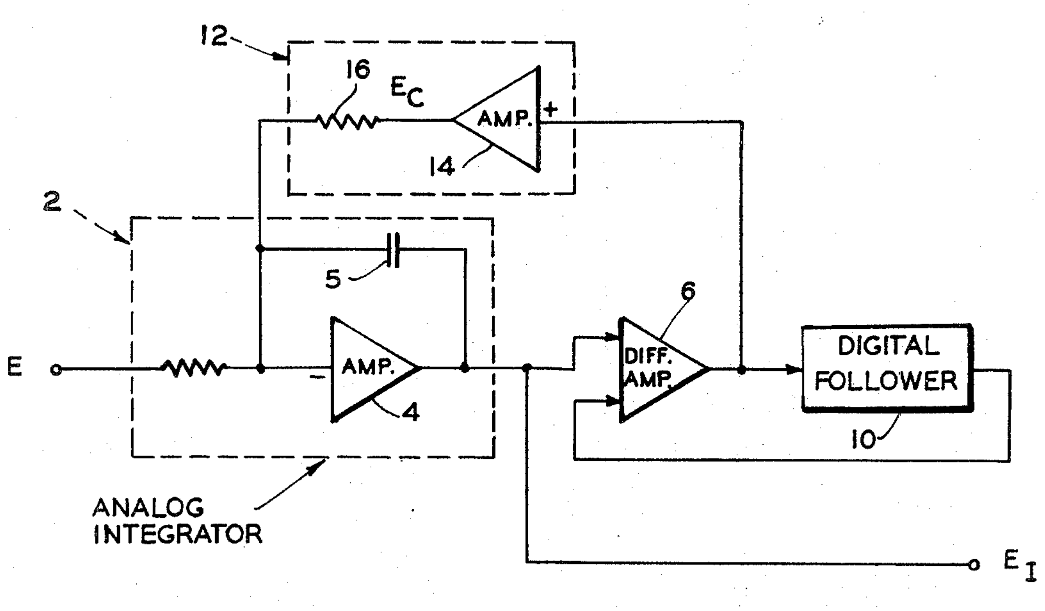
FIG. 1 is a block diagram-electrical schematic of an integrator according to the invention.

Amplifier 4 in integrator 2 is connected to a differential amplifier 6 and which amplifier 6 is connected to a digital follower 10. Digital follower 10 is connected in feedback relation to differential amplifier 6.

Differential amplifier 6 compares the signal from amplifier 4 and the feedback signal from digital follower 10 and provides an error signal which is applied to digital follower 10 for controlling the digital follower as will hereinafter be more fully described.

Amplifier 6 is connected to an amplifier 14 included in a drift correction circuit 12 so that the error signal from amplifier 6 is applied to said amplifier 14. Amplifier 14, which is of the type having negligible threshold and infinite gain provides a drift correction signal $E_c$ which is applied through a resistor 16 to amplifier 4 in integrator 2 for correcting integrator drift as will hereinafter be explained.

Figure 2:
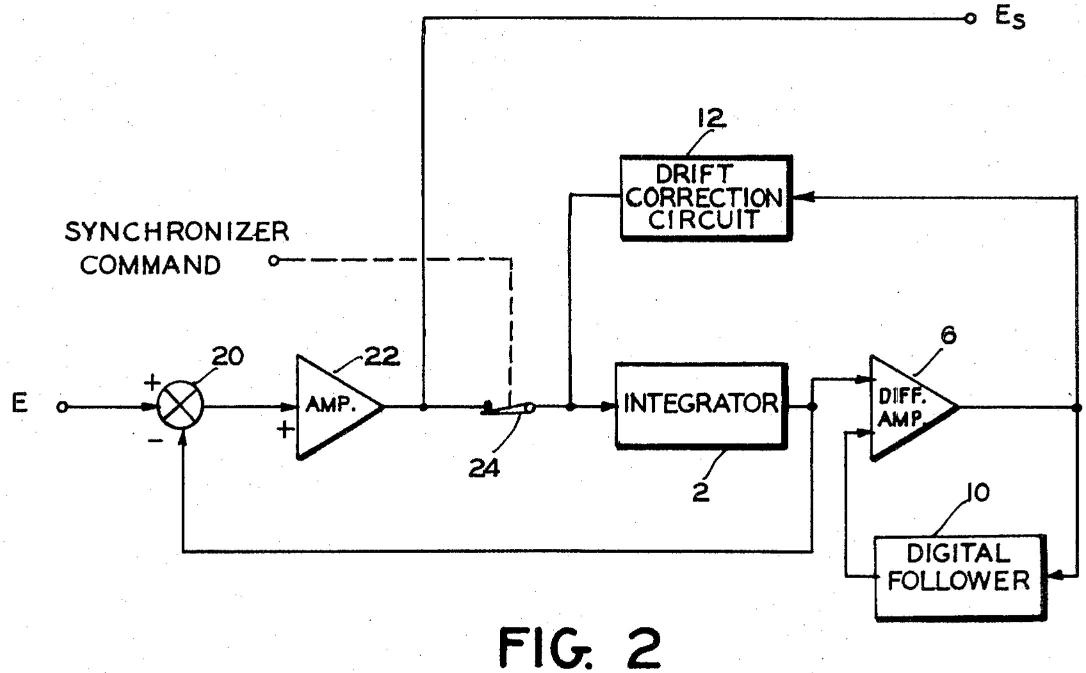
FIG. 2 is a block diagram-electrical schematic of a synchronizer according to the invention.

With reference to FIG. 2, wherein the device of the invention is shown in synchronizer configuration, signal E is applied to a summing means 20 as is the signal from integrator 2, and which integrator is shown generally in the figure. Summing means 20 provides a difference signal which is applied to an amplifier 22, and which amplifier 22 is connected through a normally closed switch 24 to integrator 2. During integration, switch 24 is closed so that signal E and the signal from integrator 2 wash out. When it is desired to operate the device in synchronizer configuration, switch 24 is manually or automatically opened in response to a synchronizing command so that amplifier 22 provides an error signal time-related or synchronized to the instant switch 24 is opened, and whereby the signal from amplifier 22 is a synchronized signal $E_s$. Digital follower 10 and drift correction circuit 12 are similarly connected in both integrator and synchronizer configurations of the invention.

Figure 3:
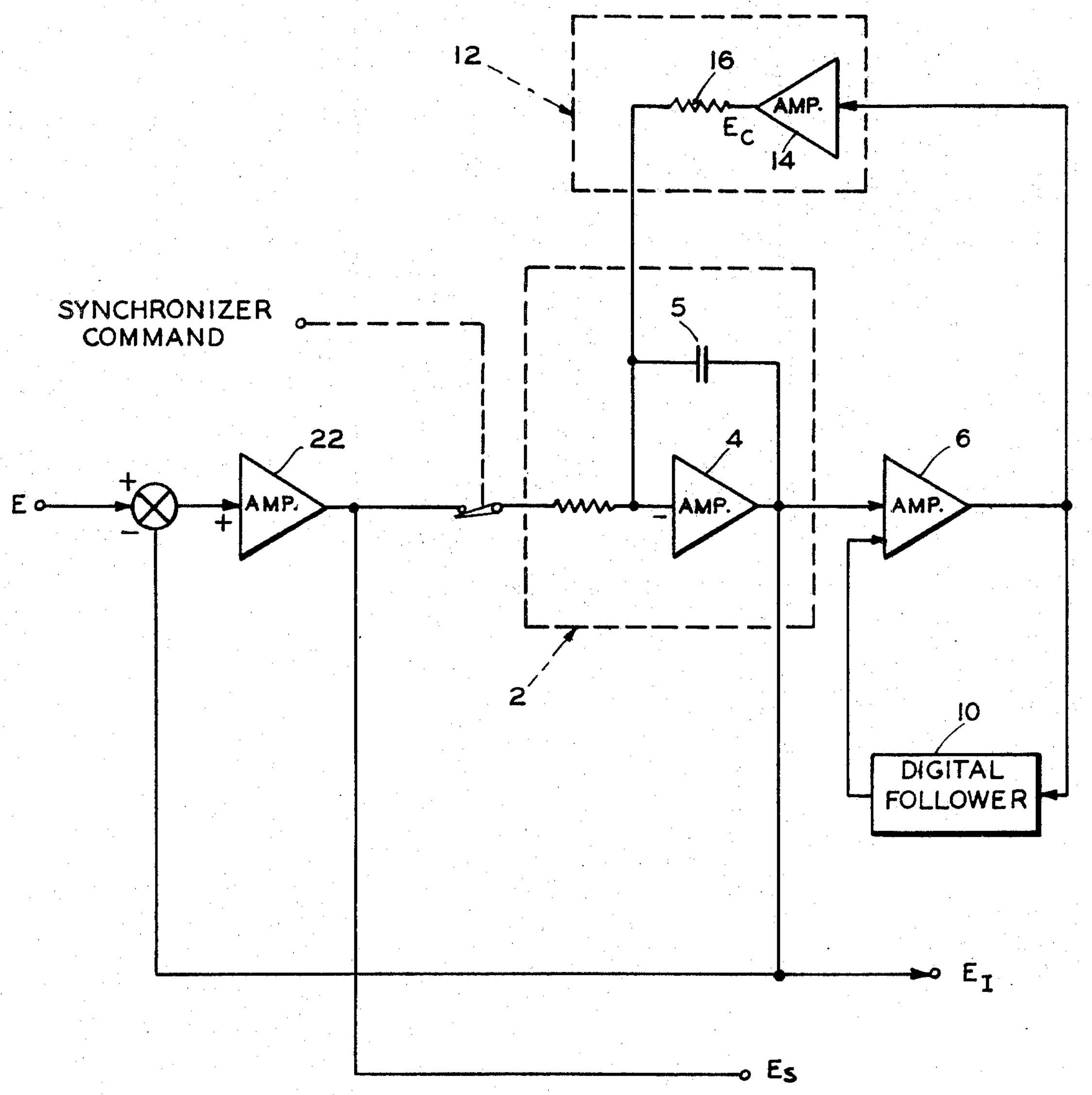
FIG. 3 is a block diagram-electrical schematic of a combined integrator/synchronizer according to the invention.

With reference now to FIG. 3, wherein the combined integrator/synchronizer is shown, it is noted that digital follower 10 may be a digital to analog converter of the type well known in the art such as shown in the June, 1968 issue of the *Electronic Engineer* and described at pages 45 and 46 thereat. It will suffice to say, for purposes of the invention, that the converter shown in the reference includes a comparator amplifier and apparatus having appropriate logic circuitry for the required memory characteristics, and appropriate logic circuitry, ladder switches and a ladder resistor-summing network for analog to digital and digital to analog conversions. Digital follower 10 thus provides a digitally generated analog voltage, and which digitally generated voltage is summed by differential amplifier 6 with the signal from amplifier 4 in integrator 2. The resulting error signal provided by amplifier 6 adjusts the output of digital follower 10 until the error signal approaches zero. However, during integration the output of digital follower 10 continually lags the change occurring in signal E applied to amplifier 4 until a "hold" time occurs, and at which time signal E is zero. When signal E is zero, digital follower 10 catches up with signal E, thereby reducing the error output from differential amplifier 6 to a low value near zero and within a predetermined threshold of digital follower 10. As long as the error signal remains within said threshold the output from digital follower 10 is, in effect, a fixed reference level held constant by virtue of digital memory within the digital follower, and which digital memory is provided by appropriate logic elements as shown in the cited reference and heretofore noted.

In order to maintain the error signal from differential amplifier 6 within the threshold of digital follower 10, said signal is further reduced toward zero by drift correction circuit 12. Signal $E_c$ from amplifier 14 in drift correction circuit 12 is applied as negative feedback and is in effect sufficient to balance out drift voltages at the input to integrator 2 so that the input to digital follower 10 is held to a low error level and always within the threshold of the digital follower. Since the error level remains within said threshold, the output from digital follower 10 remains fixed. Thus, the output from analog integrator 2 also remains fixed with certain negligible tolerances and "infinite memory" has been achieved.

The configuration of digital follower 10 and drift correction feedback circuit 12 will now be recognized as "off-line," that is, drift correction circuit 12 is not connected directly in the path of signal E and can have only an indirect and small effect on signal E at any time. One advantage of this configuration is that electromagnetic interference (EMI) noise-susceptible digital portions of the equipment are interfaced with relatively noise-immune analog portions only by way of a very low "-trickle" (signal $E_c$) feedback to amplifier 4. This feedback is strong enough only to correct for small drift errors, and consequently any temporary hardover digital outputs caused by EMI noise are not carried over as dangerous hardover disturbances to integrator 2. Sudden hardovers from EMI noise in the digital equipment are returned to normal by the analog equipment acting as a signal reference. Thus, slow errors in the analog equipment are corrected by comparison with digital equipment acting as references while, on the other hand, sudden errors in the digital equipment are corrected by comparison with the analog equipment acting as a reference. In other words, each portion of the equipment, analog and digital, provides a reference to the other.

Other advantages of the device of the invention are derived from the relative simplicity of implementation. Thus, a serial-type digital to analog converter instead of the more complicated parallel type may be used. Also complex up-down digital counters need not be used in the converter, with the simplest type of "ripple counter" being satisfactory for the purposes of the invention.

While several embodiments of the invention have been illustrated and described, various changes in the form and relative arrangements of the parts which will now appear obvious to those skilled in the art may be made without departing from the scope of the invention. Reference is, therefore, to be had to the appended claims for a definition of the limits of the invention.

What is claimed is:

1. An electrical system, comprising
means for providing an input signal;
an analog integrator connected to the input signal means for integrating the signal therefrom;
means for converting the integrator output to a digital output for imparting memory thereto, and for converting the digital output to an analog output;
comparator means connected to the analog integrator and to the converting means for comparing the integrator signal and the analog output, and for providing a signal corresponding to the difference therebetween for driving the converter;
the converting means being arranged so that the output therefrom lags the integrator output until the input signal is zero, and at which time the converting means output catches up with the integrator output and the difference signal is reduced to a level near zero within a threshold of the converting means, and the converting means output being a fixed reference held constant through the memory within the converting means as long as the difference signal is within the threshold.

2. An electrical system as described by claim 1 including:
means connected to the input signal means and to the analog integrator for summing the signals therefrom;
normally closed switching means for connecting the summing means to the integrator so that the integrator signal washes out the input signal, and
means for opening the switching means at a predetermined synchronizing instant so that the summing means provides a signal time related to the synchronizing instant.

3. An electrical system as described by claim 1, including:
means connected to the comparator and to the integrator for applying the difference signal from the comparator as negative feedback to the integrator to correct for integrator drift.

4. An electrical system as described by claim 3, wherein said means includes:
an amplifier having negligible threshold and infinite gain, and having an input connected to the comparator and an output connected to the integrator.

5. An electrical system as described by claim 4, wherein:
the integrator includes an operational amplifier having a capacitor connected in feedback relation; and
the operational amplifier has its output connected to the comparator.

6. An electrical system as described by claim 2 including:
an amplifier having negligible threshold and infinite gain and having an input connected to the comparator and an output connected intermediate the switch and the integrator, and providing a signal in response to the comparator output to correct for integrator drift.

* * * * *